United States Patent [19]

Black

[11] 3,850,295
[45] Nov. 26, 1974

[54] TIRE SHIPPING AND STORAGE STRUCTURE

[76] Inventor: Billy B. Black, 3343 N.W. Brickyard Rd., Topeka, Kans. 66618

[22] Filed: May 14, 1973

[21] Appl. No.: 359,704

Related U.S. Application Data

[63] Continuation-in-part of Ser. No. 187,983, Oct. 12, 1971, abandoned.

[52] U.S. Cl................... 206/304, 108/56, 206/386, 211/175, 214/10.5 R
[51] Int. Cl. ............................................. A47f 5/10
[58] Field of Search .. 214/10.5 R; 105/367, 369 UL; 108/51–54, 56; 206/62, 65 R, 46 T, 304, 386; 220/84; 211/175

[56] References Cited
UNITED STATES PATENTS

| | | | |
|---|---|---|---|
| 3,195,481 | 7/1965 | Verguin | 108/53 |
| 3,533,502 | 10/1970 | Hansen | 214/10.5 R X |
| 3,547,258 | 12/1970 | Black | 214/10.5 R X |

FOREIGN PATENTS OR APPLICATIONS 612,249  1/1961  Canada .......................... 214/10.5 R Primary Examiner—Frank E. Werner
Attorney, Agent, or Firm—Fishburn, Gold & Litman

[57] ABSTRACT

A tire shipping and storage structure for maintaining one or more stacks of tires in a compressed condition during shipping and storage includes a base member having a deck portion supporting a plurality of spaced stacks of tires thereon and a plurality of standards mounted on the deck portion and extending upwardly therefrom to receive a top member thereon in engagement with top tires of the stacks and secure the top member in selected spaced relation with the base member. The standards each have movable sections to permit adjusting the spacing between the base member and the top member and thereby adjusting compression on the stacks of tires.

17 Claims, 15 Drawing Figures

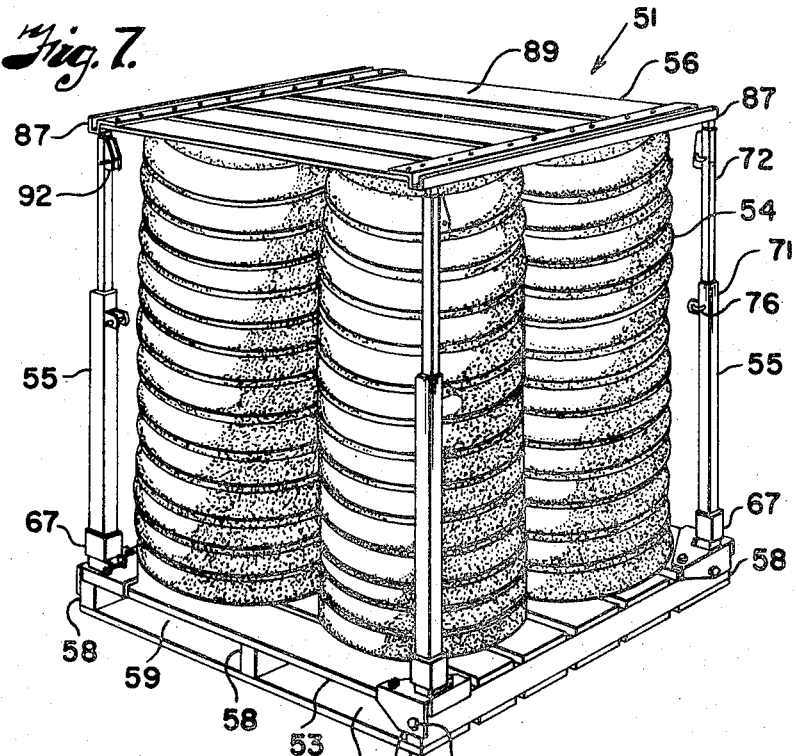
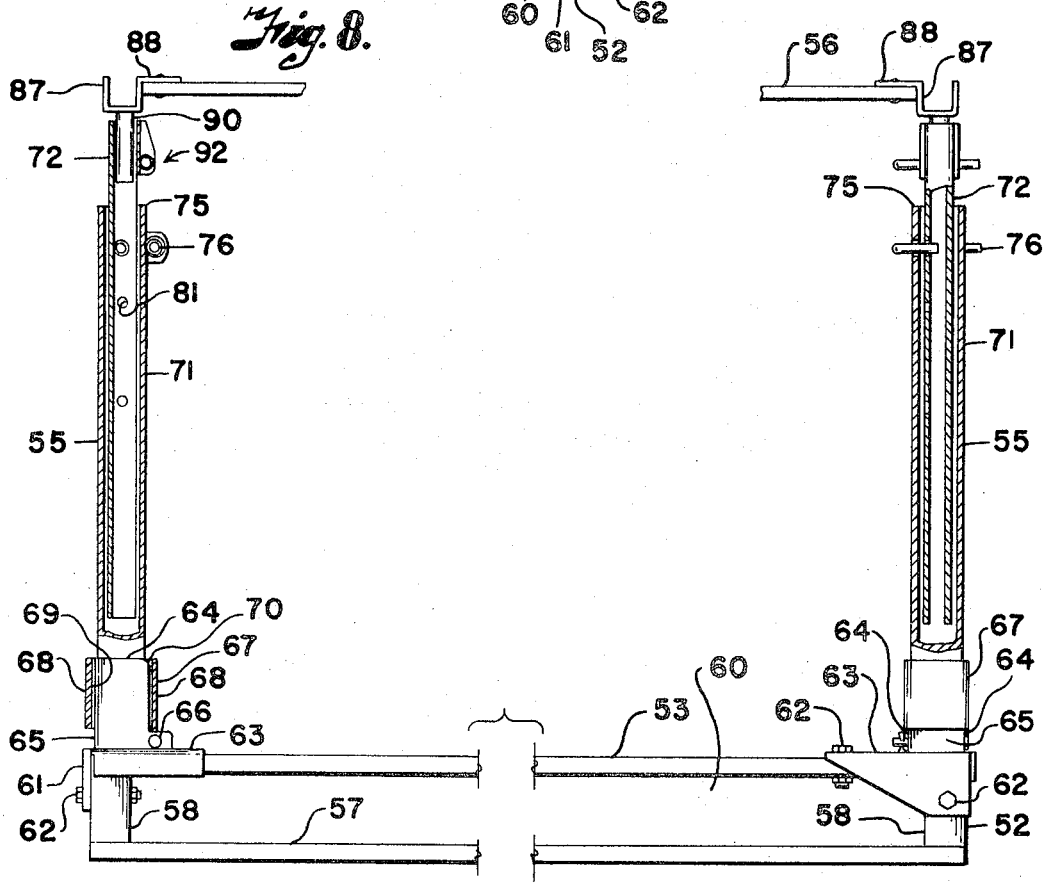

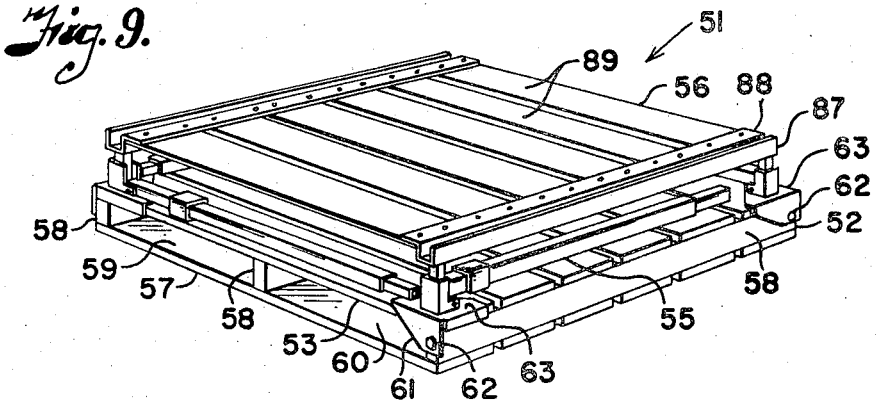
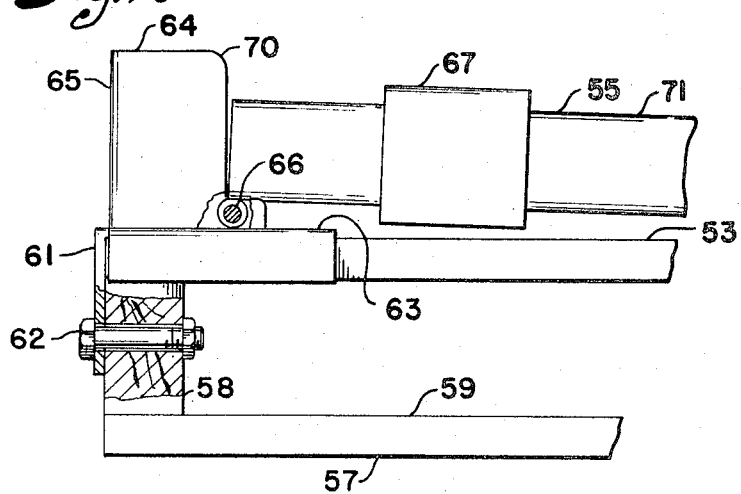
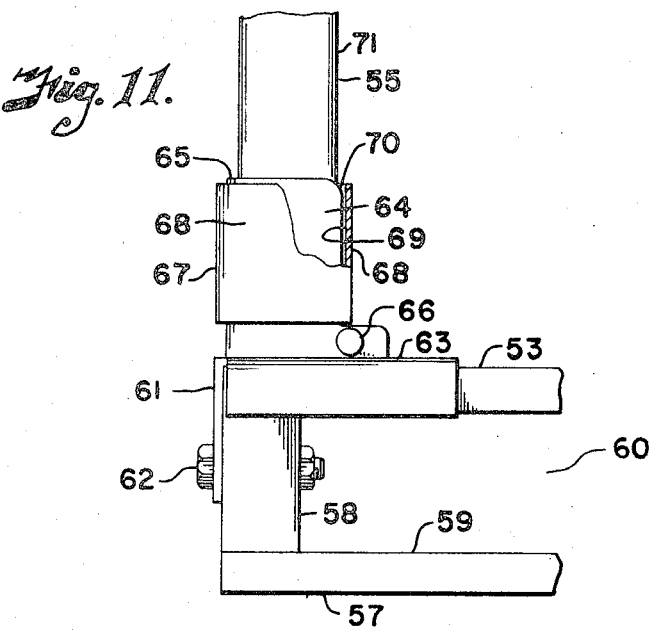

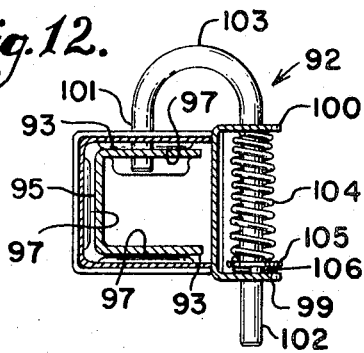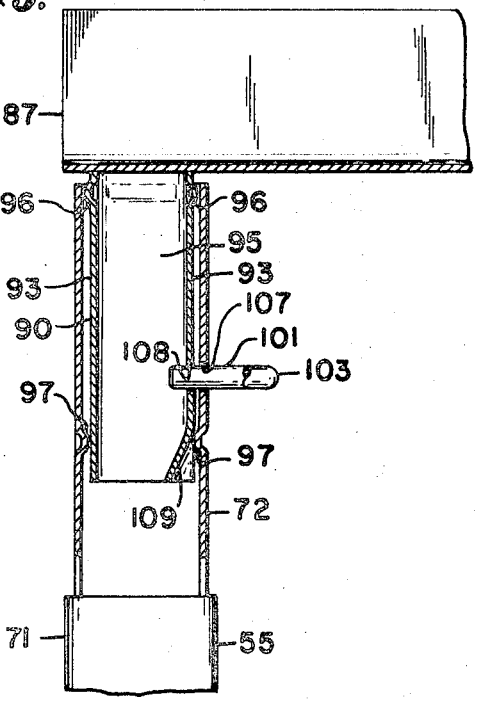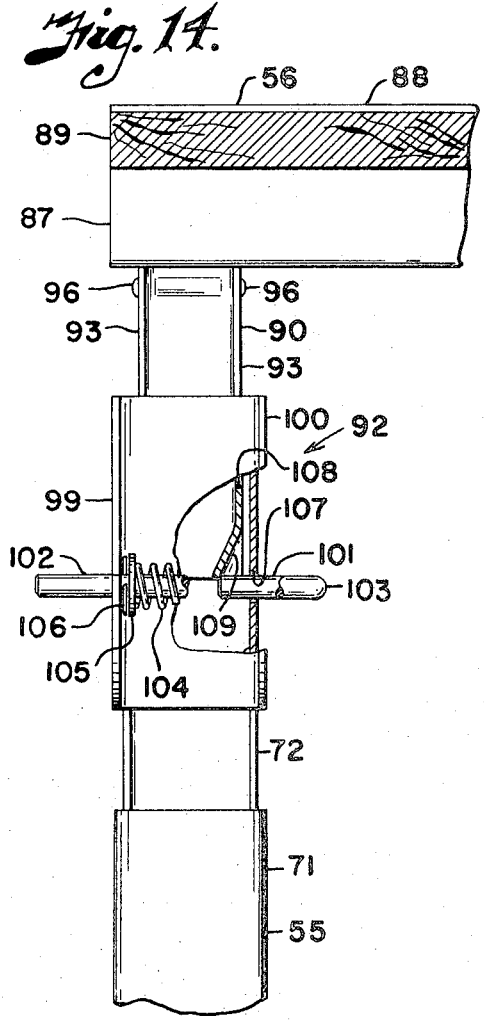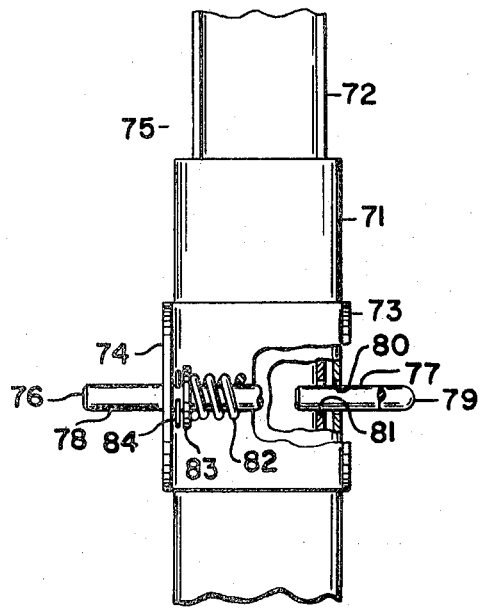

TIRE SHIPPING AND STORAGE STRUCTURE

This application is a continuation-in-part of my co-pending patent application, Ser. No. 187,983, filed Oct. 12, 1971 and now abandoned.

The present invention relates to material handling structures and more particularly to a tire shipping and storage structure adapted for use in storing and shipping vehicle tires in a compressed condition.

The methods of transporting uncompressed tires involves laced loading wherein the tires are handled individually. For example, the first tire in a row is placed flat to one side of a box car, truck bed, or the like, and other tires are placed with the tread on the floor and with an upper half extending over and laying on the previously placed tire. Tires may also be placed on suitable pallets with upright frames for loose stacking thereon. Cardboard cores may be placed in an upright position on a pallet with the tires loosely stacked around the respective cardboard core. These methods require large shipping space and repeated loading and unloading and time consuming handling before they reach the point of use.

Attempts to reduce space include bundling wherein tires are placed in a row and end-wise pressure applied to shorten the row and then the tires are secured in a compressed condition by plastic bands. The bundles often become broken or shift during transportation of same with the shifting bundles making it substantially impossible to unload the bundles of tires mechanically and efficiently. Such bundles of tires are also difficult to store and handle as the bundles shift and become uneven. Also, the tires may become warm from normal transportation and warehouse temperatures and then expand, breaking the banding whereby the tires spill out over the storage area. High temperatures also cause the tires within the bundle to expand whereby the plastic banding damages exterior tires.

The principal objects of the present invention are: to provide an adjustable material handling structure substantially reducing the aforesaid difficulties and particularly adapted to receive vehicle tires in one or more vertical stacks, compress said tires by reducing the height of the structure and maintaining the tires in a compressed condition therein during shipping and storage; to provide a tire shipping and storage structure that is collapsible to facilitate storage thereof during periods of non-use; to provide a tire shipping and storage structure that has a top member adapted to be nested with a base member when the structure is collapsed; to provide such a tire shipping and storage structure adapted to be lifted using mechanical material handling equipment, such as fork lifts; to provide such a tire shipping and storage structure which is adaptable to be adjusted in height whereby a plurality of stacks of vehicle tires thereon may be stored and shipped therein with selected compression; to provide such a tire shipping and storage structure having a base member and a top member with a plurality of standards extending therebetween and with the standards having a plurality of relatively movable members to permit adjustment of the compression on the stacks of tires between the base member and top member; to provide such an adjustable tire shipping and storage structure adapted to be stacked vertically one on another in a tier; and to provide such a tire shipping and storage structure wherein the tires therein are protected from damage by the structure itself and which is economical to manufacture, simple and positive in operation, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include an exemplary embodiment illustrating various objects and features of the tire shipping and storage structure of the present invention.

FIG. 7 is a perspective view of a modified form of tire shipping and storage structure embodying features of the present invention.

FIG. 8 is an enlarged side elevation view of the modified form of tire shipping and storage structure with portions broken away to better illustrate the component parts thereof.

FIG. 9 is a perspective view of the modified form of tire shipping and storage structure illustrating same in a collapsed condition.

FIG. 10 is an enlarged fragmentary view with sections broken away of a standard of the modified form, shown in a collapsed position to illustrate the connection of same to a base member.

FIG. 11 is an enlarged fragmentary view with sections broken away of the standard of the modified form, shown in an upright position to illustrate the connection of same to the base member.

FIG. 12 is an enlarged fragmentary sectional plan view of one of the standards of the modified form, showing means to permit removably securing the top member to the standards.

FIG. 13 is an enlarged fragmentary sectional view of members of the modified form, for connecting the top member to an upper or free end of standards extending between the top member and the base member illustrating the top member in a secured position.

FIG. 14 is an enlarged fragmentary view of the members, of the modified form, with portions broken away to show the connection between the top member and the standards with the top member in an unsecured position.

FIG. 15 is an enlarged fragmentary sectional elevation view of one of the standards of the modified form showing a latch that holds two sections of the standards in a preselected extended position.

Figure 1:
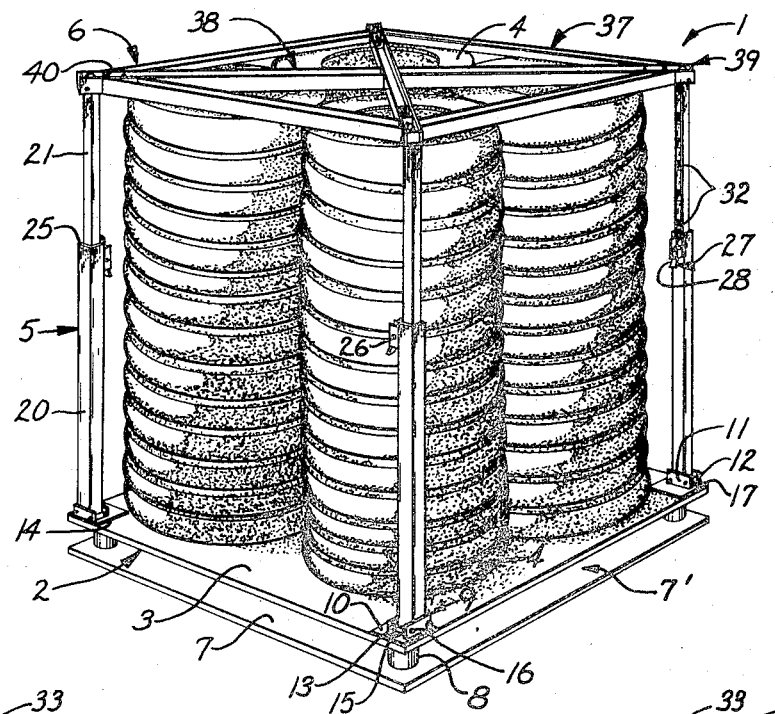
FIG. 1 is a perspective view of a tire shipping and storage structure embodying features of the present invention.
Figure 2:
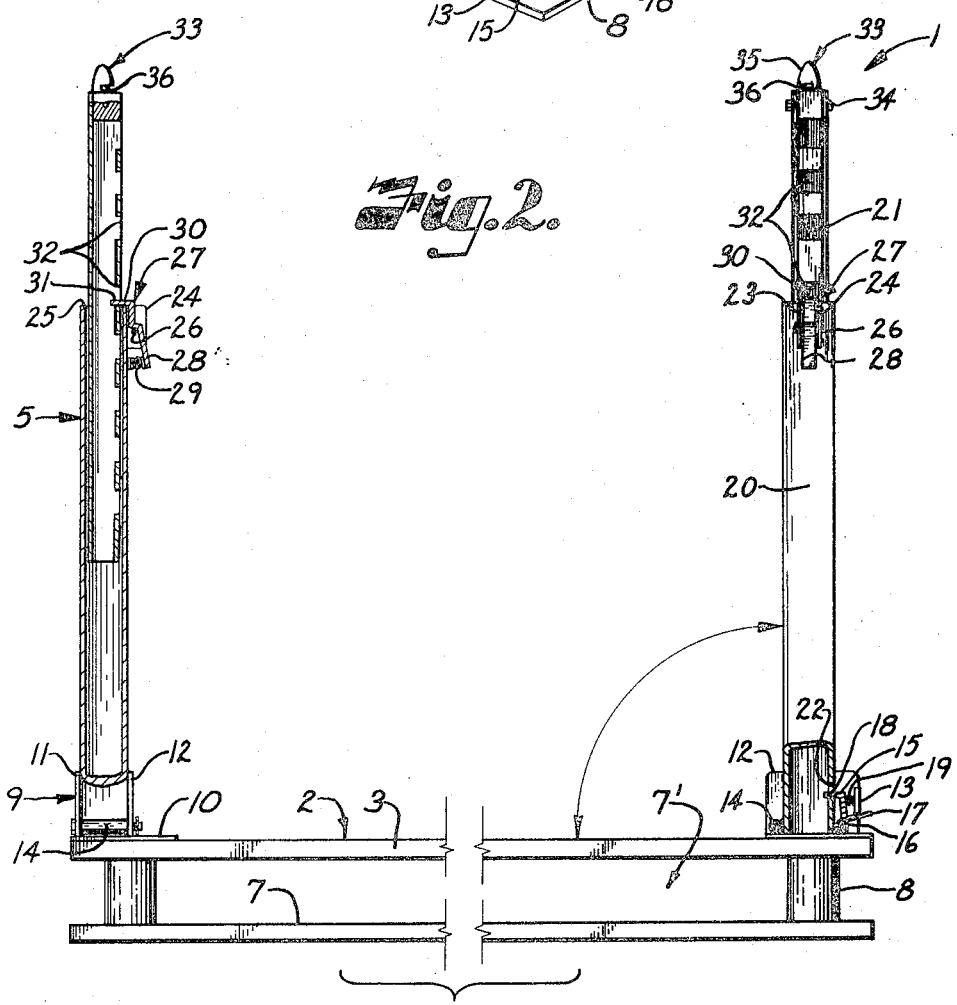
FIG. 2 is an enlarged side elevation view of the tire shipping and storage structure with portions broken away to better illustrate the component parts thereof.
Figure 3:
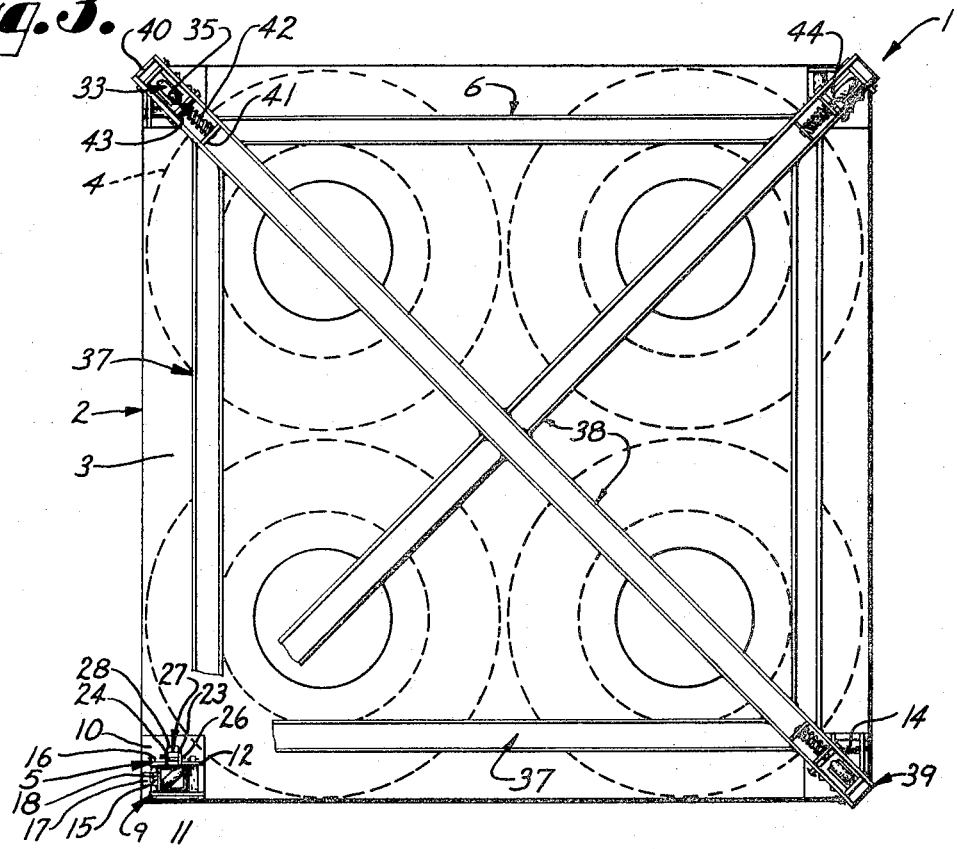
FIG. 3 is an enlarged plan view of the tire shipping and storage structure.
Figure 4:
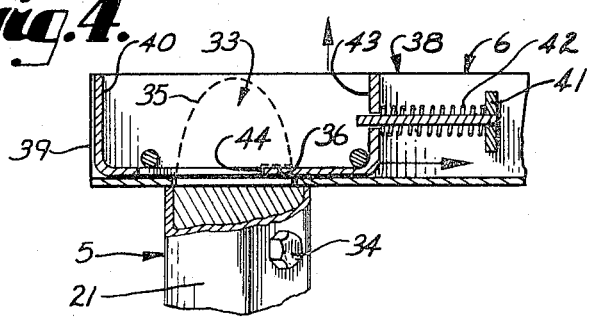
FIG. 4 is a further enlarged fragmentary sectional view of members for connecting a top member to an upper or free end of standards extending between the top member and a base member.
Figure 5:
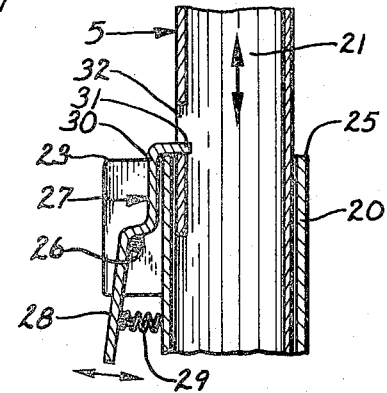
FIG. 5 is a further enlarged fragmentary sectional view of one of the standards showing means to permit telescoping of same.
Figure 6:
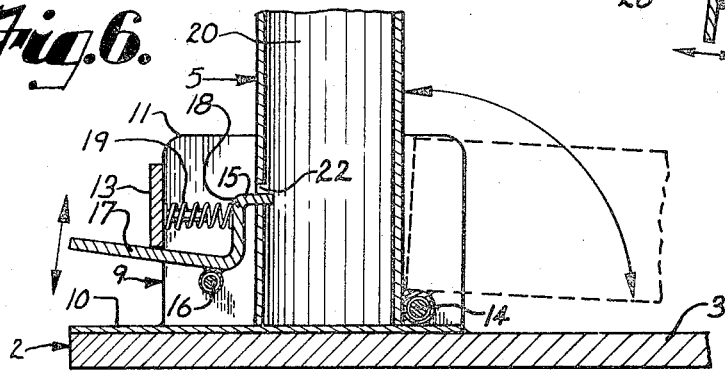
FIG. 6 is a further enlarged fragmentary sectional view showing means to permit moving the standards between an upstanding position and a folded position engaging an upper deck of the base member.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure.

In the disclosed embodiment of the present invention, the reference numeral 1 generally designates a tire shipping and storage structure particularly adapted for maintaining stacks of tires in a compressed condition during shipping and storage. The tire shipping and storage structure 1 includes a base member 2 having a deck portion 3 for supporting one or more stacks of tires 4 thereon. The base member is preferably a pallet for movement with conventional pallet handling equipment. A plurality of standards 5 are mounted on the deck portion 3 and extend upwardly therefrom to receive a top member 6 thereon in engagement with top tires 4 of the stacks and to secure the top member 6 in spaced relation with the base member 2. The standards 5 each permit adjusting the spacing between the base member 2 and the top member 6 and thereby adjust compression on the stacks of tires 4.

The base member 2 may be any suitable structure adapted to support one or more stacks of tires 4 thereon and to permit lifting of the tire shipping and storage structure 1 by means of mechanical material handling equipment, such as fork lifts (not shown) having arms or prongs thereof engaging the base member 2. In the illustrated structure, a lower deck member 7 is spaced from the deck portion 3 and is maintained in spaced relation therewith by a plurality of spacers 8 extending between the deck portion 3 and the lower deck member 7 and providing openings 7' between the spacers 8 to permit the arms or prongs of a fork lift (not shown) to extend therebetween to lift and move the tire shipping and storage structure 1.

The standards 5 each have one end mounted on the deck portion 3 and extend upwardly therefrom and have the top member 6 removably connected to an upper or free end thereof, as later described. It is preferred to have the standards mounted whereby they may be removed or released for moving to an overlying position on the base member. In the illustrated structure, the standards 5 each have a support portion 9 suitably mounted on the deck portion 3 of the base member 2, as by a plurality of suitable fastening members. The support portion 9 has a planar base 10 engaging an upper surface of the deck portion 3 and having a pair of spaced side walls 11 and 12 extending upwardly from the base 10 and an end wall 13 extending between the side walls 11 and 12 to form a guide for the respective standard 5 when moving same between a folded position engaging the deck portion 3 and an upstanding or upright position having the top member 6 mounted thereon, as later described.

It is preferred that the standards and base member 2 remain connected together to prevent loss of parts and in the illustrated structure, a lower end of each of the standards 5 is hingedly mounted on the support portion 9, as by a pin or shaft 14 suitably secured to the lower end of each of the standards 5 and extending into bearing portions in the side walls 11 and 12 for rotatably mounting same. A keeper member 15 is positioned on an opposite side of the standards 5 and is pivotally mounted on the support portion 9, as by a pin or shaft 16 extending into bearing portions in the side walls 11 and 12 for rotatably mounting same. The keeper member 15 includes a lever portion and a keeper portion movably mounted for selective engagement with the respective standard 5 and in the illustrated structure, the keeper member 15 includes an arm or lever 17 extending outwardly through the end wall 13 and adapted to be engaged by one foot of an operator to release the keeper member 15 from the standard 5. The keeper member 15 has a keeper portion or flange 18 selectively engageable with the standard 5 to maintain same in an upstanding position. A suitable resilient member, such as a compression spring 19, is positioned between the keeper member 15 and the end wall 13 to thereby urge the flange 18 toward and into engagement with the standard 5.

The standards 5 may have one or more sections and in the illustrated structure said standards have two sections with one movable longitudinally of the other. It is preferred that the standards be telescoping members having slidably engaging sections and in the illustrated structure, the standards 5 each have a tubular first section 20 having the pin or shaft 14 mounted on a lower end thereof and a tubular second section 21 received in the first section 20 and movable longitudinal thereof. The first section 20 has a slot or aperture 22 positioned to receive the flange 18 of the keeper member 15 with the flange 18 engaging a wall portion of the first section 20.

Spaced ears 23 and 24 extend outwardly from each first section 20 adjacent an upper or free end 25 thereof. A pin or shaft 26 extends between the ears 23 and 24 and has respective opposite ends rotatably mounted thereon. A keeper member 27 is suitably secured to the pin or shaft 26, as by welding, and has a lower portion 28 extending generally downwardly from the pin or shaft 26 and a suitable resilient member, such as a compression spring 29, extends between the first section 20 and the lower portion 28 of the keeper member 27 to urge an upper portion 30 of the keeper member 27 toward the upper or free end 25 of the first section 20. The upper portion 30 of the keeper member 27 has a flange 31 engageable with the upper or free end 25 of the first section 20 and with the second section 21, as later described, to maintain the second section 21 in a selected position longitudinally of the first section 20.

The second sections 21 of the standards 5 each have a plurality of longitudinally spaced and longitudinally extending slots 32 therein to define shoulders engageable by the flange 31 of the keeper member 27 which is engageable with a wall portion of the second section 21 to limit longitudinal movement thereof relative to the respective first section 20.

The second section 21 has a latch member or members to receive a keeper or the like on the top member 6 to hold same in selected spaced relation to the base member. In the illustrated structure, an end member 33 is suitably secured in an upper or free end of the second section 21 of each of the standards 5, as by bolts 34. The end member 33 has a cam surface 35 thereon, for a purpose to be later described, and the end member 33 has a downwardly facing shoulder 36 therein positioned adjacent the cam surface 35 to receive a portion of the top member 6 therein to thereby maintain the top member 6 in spaced relation with the deck portion 3.

The top member 6 may be any suitable structure having portions thereof engageable with the top tire 4 in each of the stacks of tires within the tire shipping and storage structure 1. The illustrated top member 6 is a generally square or rectangular frame having side members 37 and diagonal cross bracing members 38. The cross bracing members 38 have extensions 39 positioned above and engageable with the end members 33 of the standards 5. The extensions 39 each have a slide or keeper member 40 movably mounted thereon. An abutment 41 is mounted on each of the extensions 39 and has a suitable resilient member, such as a compression spring 42, extending between a flange portion 43 of the slide or latch member 40 and the abutment 41. The spring 42 urges the slide or latch member 40 away from the abutment 41 and toward the cam surface 35 on the respective end member 33.

Downward movement of a cam engaging edge 44 of the slide member 40 effects movement of the slide or latch member 40 toward the abutment 41. When the cam engaging edge 44 of the slide or latch member 40 is aligned with and below the downwardly facing shoulder 36, the spring 42 urges the slide or latch member 40 into engagement with same, thereby securing the respective extension 39 of the bracing members 38 to the end member 33 of the respective standards 5.

In using a tire shipping and storage structure as illustrated and described, the tires 4 are arranged in a plurality of stacks on the deck portion 3. The base member 2 and the tires 4 thereon are placed in a suitable machine (not shown) which is adapted to reduce the space between the base member 2 and the top member 6, thereby compressing the tires 4 within the tire shipping and storage structure 1. During compressing the tires 4, the keeper members 27 are disengaged from the respective second sections 21 of the standards 5 and the top member 6 and the second sections 21 are moved toward the base member 2, thereby compressing the tires 4 therebetween. The keeper members 27 are released to permit the flanges 31 to move into the respective slots 32 in the second sections 21 thereby maintaining the spacing between the base member 2 and the top member 6 and resisting the pressure exerted by the tires 4 attempting to return to an uncompressed condition.

The tire shipping and storage structure 1 is particularly adapted for a novel method of shipping and storing vehicle tires wherein a plurality of vehicle tires are placed in at least one stack therein and the tire shipping and storage structure 1 is placed in the machine which compresses the structure and the tires therein by reducing the spacing between the base member 2 and the top member 6. The structure 1 is maintained in such a compressed condition during shipping and storing the structure and the tires therein.

Prolonged storage of vehicle tires in a highly compressed condition may cause set or otherwise cause damage to the tires. Therefore, for storage, compression of the tires in the structure 1 is adjusted or decreased by disengaging the keeper members 27 to permit the top member 6 to move away from the base member 2. The preferred method of adjusting the spacing between the base member 2 and the top member 6 is by placing the structure 1 in a suitable machine (not shown) and moving the base member 2 and the top member 6 toward each other whereby the keeper members 27 may be disengaged and then allowing the respective structure to expand to a less compressed condition or return to its original condition thereby allowing the tires 4 therein to partially decompress or return to an uncompressed condition respectively. After a selected time period the structure and the tires therein may be partially recompressed whereby the same may be stored in a substantially reduced space as compared to uncompressed tires.

FIGS. 7 through 15 inclusive illustrate a modified form of the present invention wherein the reference numeral 51 designates generally a tire shipping and storage structure. The structure 51 includes a base member 52 having a deck portion 53 for supporting one or more stacks of tires 54 thereon. The base member 52 is preferably in the form of a pallet that is adapted for movement with conventional pallet handling equipment. A plurality of standards 55 are mounted on the deck portion 53 and extend upwardly therefrom to receive a top member 56 thereon, wherein the top member 56 is in engagement with the top tires 54 of the stack or stacks and to secure the top member 56 in selected spaced relation to the base member 52.

The base member 52 may be of any suitable structure adapted to support one or more stacks of tires 54 thereon and to permit lifting of the structure 51 by means of conventional material handling equipment such as forklifts (not shown) wherein the forklift has arms or prongs thereof adapted to engage the base member 52. As illustrated, the base member 52 has a lower portion 57 that is spaced from the deck portion 53, said deck portion 53 and lower portion 57 being secured to beams or sills 58. In the structure illustrated both the deck portion 53 and lower portion 57 are a plurality of planks 59 or the like with each having suitable spacing. The beams 58 provide openings 60 between the deck portion 53 and lower portion 57 to permit the arms or prongs of a forklift (not shown) to extend therebetween for lifting and moving the structure 51.

The standards 55 each have one end mounted on the base member 52 wherein the standards 55 extend upwardly from the deck portion 53 and have the top member 56 preferably removably connected to an upper or free end of each of the standars 55, as later described. Preferably the standards 55 are mounted in such a manner whereby they can be selectively moved from an upstanding load carrying position to a collapsed or substantially prone position overlying the base member 52 as for return shipping of the structure. In the illustrated structure, the standards 55 each have a base or support portion 61 suitably mounted on the deck portion 53 as by a plurality of suitable fasteners 62, such as bolts and nuts. The support portion 61 as illustrated has a planar base portion 63 in engagement with an upper surface of the deck portion 53 and has a pair of spaced side walls 64 to form a guide for the respective standard 55 when moving same from a folded or collapsed position to an upstanding or upright position as later described. Preferably, the folded or collapsed position is such that the standards 55 engage the deck portion 53. As illustrated, a bight portion or wall 65 extends between the spaced side walls 64 wherein the walls 64 and 65 form a channel member having an open side wherein the wall 65 is an abutment or a stop to limit the amount of upward swinging movement of the standards 55 and position same upright.

In the illustrated structure, a lower end of each of the standards 55 is hingedly mounted on the support portion 61 as by a pin or shaft 66 that is suitably connected to the lower end of each of the standards 55 with the pins 66 extending into bearing portions in the side walls 64 for rotatably mounting same thereon. Preferably, keeper means are provided to maintain the standards 55 in an upright position and as illustrated, the keeper means includes a sleeve 67 that cooperates with the support 61 and the standard 55 to maintain the standards 55 in the upright position. As illustrated, the sleeve 67 is a rectangularly shaped tubular member formed of walls 68 defining a rectangular opening 69 through the sleeve 67. The opening 69 is sized so that the sleeve 67 is slidable over the exterior of the walls 64 and 65 whereby one of the walls 68 closes the opening between the side walls 64 to secure the standards 55 in an upright position. Each standard 55 is moved to position in engagement with the respective wall 65 and the respective sleeve 67 is moved downwardly to close the opening between the walls 64 whereby one of the walls 68 of the sleeve 67 prevents the respective standard 55 from hingedly moving about the respective pin 66. As illustrated, the side walls 64 each have a radius or arcuate corner 70 to help prevent binding of the sleeves 67. When the standards 55 are being moved to an upright position, the corner 70 providing a contoured bearing surface for restriction free movement of the sleeve 67 thereover.

The standards 55 may be of one piece construction but to facilitate their use the standards 55 can have one or more sections and as illustrated, the standards 55 have two sections with one moveable longitudinally of the other. It is preferred that the standards be telescoping members having slidably engaging sections and as illustrated, the standards 55 each have a tubular first section 71 that has the pin or shaft 66 mounted on a lower end thereof. A second section 72 is received in the interior of the first section 71 and is movable longitudinally thereof. It is preferable to maintain the second sections 72 in a selected position. As illustrated, spaced abutment forming members or ears 73 and 74 are secured to and extend outwardly from each of the first sections 71 adjacent a respective upper or free end 75 thereof. A suitable latch structure is arranged to hold the telescoping or relatively moveable sections of the standards 55 in selected extension. It is preferred that the latch be spring biased and automatic. In the illustrated structure a latch member 76 is mounted on the ears 73 and 74 and is operable to hold the second section 72 in a selected position. In the particular structure illustrated the latch member 76 is generally J-shaped having spaced apart shank portions 77 and 78 with a bight portion 79 therebetween. The first sections 71 and second sections 72 each have apertures 80 and 81 respectively through adjacent walls thereof wherein when selected respective apertures 80 and 81 are in alignment or registry, the respective shank 77 extends therethrough to hold the second sections 72 in a selected position. Preferably, the first section 71 has one aperture 80 and the second section 72 has a plurality of longitudinally spaced apertures 81.

Each latch member 76 is provided with means to hold the shank 77 in a position extending through the respective apertures 80 and 81 and to prevent accidental disengagement of the latch member 76. As illustrated, a resilient member 82 such as a compression spring is mounted on the shank 78 and is positioned between the ears 73 and 74. An abutment member is provided on the shank 78 for engagement with one end of the spring 82 whereby the spring 82 is restrained between the ear 73 and the abutment and can apply force to the latch member 76. As illustrated, the abutment member includes a washer 83 on the shank 78 and a keeper 84 such as a cotter-pin secured to the shank 78 to restrict movement of the washer 83. The spring 82 is restrained between the ear 73, the washer 83 and keeper 84 whereby movement of the shank 77 from the registered apertures 80 and 81 causes the spring 82 to compress so as to induce movement of the latch member 76 back through the registered apertures 80 and 81 upon release of the latch 76.

The top member 56 may be of any suitable structure having portions thereof engageable with the top tire 54 in each of the stacks of tires within the tire shipping and storing structure 51. The illustrated top member 56 is generally rectangular having side or brace members 87 extending along two opposed sides thereof. The braces 87, as illustrated, are channel shaped and each have a flange portion 88 extending from one side thereof. A plurality of rigid members 89 are secured to the flanges 88 and extend between the opposed braces 87 forming a surface with portions thereof engageable with the top tires 54. Connecting members or connectors 90 are secured to the side members 87 depending therefrom for engagement with portions of respective second sections 72 for securing the top member 56 to the second section 72.

Preferably the top member 56 is secured to the second sections 72 in such a manner as to be easily removable. In the illustrated structure, latch members 92 are mounted on the second section 72 and are operable to removably secure the top member 56 to the second sections 72. The connectors 90 depend from the top member 56 and are sized and shaped suitably to be received within the upper end of the second section 72. As illustrated, the connectors 90 are channel shaped formed by opposed side walls 93 having a wall 95 connecting same and having an opening between the side walls 93. It is preferred that the connectors 90 have sufficient clearance with the interior surface of the second section 72 so as to facilitate entry of each of the connectors 90 into the respective second section 72 and still have a minimum of clearance therebetween to prevent play or excessive relative movement when the top member 56 is secured to the standards 55. The connectors 90 each have protuberances or ribs 96 projecting outwardly from each of the walls 93 and 95 adjacent the side members 87. The second sections 72 each have protuberances or ribs 97 extending inwardly from the walls defining same wherein the ribs 97 are sized suitably to engage the walls 93 and 95 to eliminate play therebetween and the ribs 96 have an outer dimension suitable to engage the exterior of the second sections 72 to prevent play between the ribs 96 and the second sections 72.

A suitable latch structure is arranged to keep the top member 56 secured to the standards 55. In the illustrated structure, spaced ears 99 and 100 are secured to and extend outwardly from each of the second sections 72 and have the latch members 92 mounted thereon. As illustrated, the latch members 92 are J-shaped having shanks 101 and 102 spaced apart with a bight portion 103 therebetween. Preferably, the latch members 92 are provided with means to maintain same in a latch position. As illustrated, resilient members 104 such as compression springs are mounted on each of the shanks 102 and are operable to be compressed between the respective ear 99 and a washer 105 and keeper 106 such as a cotter-pin mounted on each shank 102 whereby force applied by each spring 104 to the respective ear 99 and washer 105 urges the latch members 92 to remain in a latch position. Apertures 107 and 108 extend through each second section 72 and connector 90 respectively and are in registry when the top member 56 is mounted on the second section 72. Each shank 101 extends through the respective apertures 107 and 108 to removably secure the top member 56 to the standards 55.

To facilitate securing the top member 56 to the second sections 72, a cam surface portion 109 is provided on the connecting members 90 whereby the cam surface 109 will urge the latch member 92 to move to an unlatched position when the connectors 90 are inserted in the second sections 72. The connectors 90 are moved within the respective second section 72 until the apertures 107 and 108 are in registry wherein the spring members 104 will induce the latch members 92 to move to a latch position so that the shanks 101 extend through the respective apertures 107 and 108 securing the top member 56 to the second sections 72.

In using the tire shipping and storage structure 51, the standards 55 are secured in their upright position and adjusted to the desired height after which the top member 56 is secured to the standards 55. The tires 54 are placed in a suitable machine (not shown) which is adapted to reduce the height of the stack of tires 54 whereby the tires 54 are compressed before placing same between the top member 56 and the base member 52. The tires are placed between top member 56 and base member 52 whereby on release of the pressure or force applied to the stacks of tires 54 they will expand against the deck portion 53 and the top member 56 and be restrained therebetween by the remaining compression. The first section 71 and second section 72 provide adjustment for the spacing between the top member 56 and the base member 52 to accommodate different quantities of tires. It is to be noted that the construction of the top member 56 and the base member 52 provide unobstructed loading and unloading of the tires 54 by presenting an obstruction free space between the upper deck 53 and the top member 56 and the standard 55. Preferably the opposed surfaces of the top member 56 and the base member 52 that engage the stacks of tires 54 are substantially flat and extend to at least one edge of each on the same side of the structure 51 providing the unobstructed entry. When the tires are unloaded from the tire shipping and storage structure 51 it can be collapsed or folded for storage. To collapse the structure 51 the standards 55 are retracted to their shorter lengths and the sleeves 67 are moved from engagement with the support portion 61 to permit hinging movement of the standards 55 about the pin 66 so that they may be moved to a folded position in engagement with or substantially lying on the deck portion 53. The top member 56 is then moved to a position overlying the base member 52 wherein the connectors 90 are inserted between the walls 64 and 65 wherein the top member 56 is nested on the base member 52 and is prevented from moving laterally relative to the base member 52.

While the tires are held in partially compressed or uncompressed condition, the structures 1 and 51 with tires in place may be moved to selected storage areas and stacked in tiers with a base member of an upper structure resting on the top member of a lower structure. When so stacked, tires may be removed from one stack in a structure without disturbing other stacks resting on the base member.

It is to be understood that while I have illustrated and described one form of my invention, it is not to be limited to the specific form or arrangement of parts herein described and shown.

What I claim and desire to secure by Letters Patent is:

1. A tire shipping and storage structure comprising:

a. a base member having substantially horizontal deck portion adapted to support at least one stack of tires, said deck portion having peripheral edges;

b. a plurality of standards mounted on the deck portion adjacent peripheral edges and extending upwardly therefrom;

c. a top member having portions engageable with respective top tires of the stacks of tires supported on the deck portion;

d. cooperating means on said top member and on said standards to secure said top member on said standards and in spaced relation with the deck portion and to hold tires compressed therebetween, said tires being held only by the base member deck portion and the top member; and e. means on said standards to permit adjusting the spacing between said top member and the deck portion of said base member in response to pressure longitudinally of said standards.

2. A tire shipping and support structure as set forth in claim 1 wherein:

a. said standards each have a first section mounted on said upper deck portion of said base member and a second section slidably engaged with said first section and movable longitudinally thereof;

b. said means on said standards to permit adjusting the spacing between said top member and said deck portion comprises cooperating means on the first and second sections thereof to permit adjusting the spacing between said top member and said deck portion of said base member; and c. said cooperating means includes a keeper member mounted on one of said first and second sections and resiliently and selectively engageable with the other of said first and second sections of said standards.

3. A tire shipping and support structure as set forth in claim 2 wherein:

a. each of said standards has a support portion mounted on the deck portion of said base member;

b. the first section of each of said standards is hingedly connected to the respective support portion to permit moving said first sections between a folded position engaging the deck portion of said base member and an upstanding position; and c. said support portions and the respective first sections have cooperating latch means thereon to selectively lock the first sections in the upstanding position.

4. A tire shipping and storage structure comprising:

a. a base member having spaced apart upper and lower deck portions and passages between said deck portions, said upper deck portion being adapted to support a plurality of spaced stacks of tires;

b. a plurality of spaced standards mounted on the upper deck portion of said base member and extending upwardly therefrom;

c. a top member having portions engageable with respective top tires of the stacks of tires supported on the upper deck portion;

d. cooperating means on said top member and on said standards to removably secure said top member on said standards and in spaced relation with the upper deck portion of said base member; and e. means on said standards to permit adjusting the spacing between said top member and the upper deck portion of said base member in response to pressure longitudinally of said standards to thereby vary compression on the stacks of tires between said base member and said top member and latching the top member and upper deck portion in selected position for desired tire compression.

5. A tire shipping and storage structure as set forth in claim 4 wherein:

a. said standards each have a first section mounted on said upper deck portion of said base member and a second section slidably engaged with said first section and movable longitudinally thereof;

b. each of said second sections has a plurality of longitudinally spaced slots therein; and c. each of said first sections has a keeper member movably mounted thereon and having a portion movable into a selected one of the slots in the respective second section and engageable with said second section to maintain a certain spaced relation between said top member and said base member.

6. A tire shipping and storage structure as set forth in claim 5 wherein:

a. each of said standards has a planar support portion mounted on the upper deck portion of said base member;

b. the first section of each of said standards has one end thereof hingedly connected to the respective support portion to permit moving said first sections between a folded position engaging the upper deck portion of said base member and an upstanding position; and c. said support portions and the respective first sections have cooperating means thereon to maintain the first sections in the upstanding position.

7. A tire shipping and support structure comprising:

a. a load carrying pallet having a deck for receiving one or more stacks of tires with the tires of a stack being one on another in vertical alignment;

b. a top member having portions with lower faces engaging top tires of the stack and substantially parallel with the pallet deck;

c. rigid members extending between said pallet deck and the top member;

d. said top member being movable relative to the pallet to adjust the spacing and compression of tires therebetween;

e. latch means selectively connecting the top member, rigid means and pallet to secure same in selected position and tire compression; and f. said rigid means being releasable for positioning substantially in overlying relation to the pallet.

8. A tire shipping and storage structure comprising:

a. a base member having a deck portion adapted to support at least one stack of tires;

b. a plurality of standards mounted on the deck portion and extending upwardly therefrom;
   1. said standards each have a tubular first section mounted on said deck portion of said base member and a tubular second section received in said first section and movable longitudinally thereof;
   2. each of said second sections has a plurality of longitudinally spaced shoulders thereon;

c. a top member having portions engageable with respective top tires of the stacks of tires supported on the deck portion;

d. cooperating means on said top member and on said standards to secure said top member on said standards and in spaced relation with the deck portion;

e. means on said standards to permit adjusting the spacing between said top member and the deck portion of said base member in response to pressure longitudinally of said standards;

f. each of said first sections has a latch member movably mounted thereon and having a portion movable into engagement with a selected one of shoulders on the respective second section to maintain a certain spaced relation between said top member and said base member.

9. A tire shipping and storage structure comprising:

a. a base member having a deck portion adapted to support at least one stack of tires;

b. a plurality of standards mounted on the deck portion and extending upwardly therefrom;

c. a top member having portions engageable with respective top tires of the stacks of tires supported on the deck portion;

d. cooperating means on said top member and on said standards to secure said top member on said standards and in spaced relation with the deck portion;
   1. a cam surface on a free end of each of said standards;
   2. a downwardly facing shoulder on the free end of each of said standards and adjacent the cam surface thereon;
   3. a latch member movably mounted on said top member for each of said standards and having a portion thereof engageable with said respective cam surface and movable into engagement with the shoulder on the free end of said respective standard;

4. means engaging said latch member for urging same into engagement with said shoulder thereby securing said top member in position relative to said base member;

e. means on said standards to permit adjusting the spacing between said top member and the deck portion of said base member in response to pressure longitudinally of said standards.

10. A tire shipping and storage structure comprising:

a. a base member having spaced apart upper and lower deck portions and passages between said deck portions, said upper deck portion being adapted to support a plurality of spaced stacks of tires;

b. a plurality of spaced standards mounted on the upper deck portion of said base member and extending upwardly therefrom;

c. a top member having portions engageable with respective top tires of the stacks of tires supported on the upper deck portion;

d. said standards each have a first section mounted on said upper deck portion of said base member and a second section slidably engaged with said first section and movable longitudinally thereof;

e. each of said second sections has a plurality of longitudinally spaced slots therein;

f. each of said first sections has a keeper member movably mounted thereon and having a portion movable into a selected one of the slots in the respective first section and engageable with said first section to maintain a certain spaced relation between said top member and said base member;

g. cooperating means on said top member and on said standards to removably secure said top member on said standards and in spaced relation with the upper deck portion of said base member, said cooperating means including:
   1. an end member mounted on a free end of each of said first sections of said standards;
   2. a cam surface on each of said end members;
   3. a downwardly facing shoulder on each of said end members and adjacent the cam surface thereon;
   4. a latch member movably mounted on said top member for each of said end members and having a portion thereof engageable with respective cam surface and movable into engagement with the shoulder on the respective end member thereby securing said top member in position relative to said base member.

h. means on said standards to permit adjusting the spacing between said top member and the upper deck portion of said base member in response to pressure longitudinally of said standards to thereby vary compression on the stacks of tires between said base member and said top member.

11. A tire shipping and storage structure comprising:

a. a base member having a substantially horizontal deck portion adapted to support at least one stack of tires, said deck portion having peripheral edges;

b. means associated with said deck portion and swingably mounting a plurality of standards in the deck portion adjacent the peripheral edges, said standards being swingable from an upright position, extending upwardly from said base member, to a substantially prone position overlying said base member;

c. means associated with each said standard for selectively securing same in said upright position;

d. a top member having portions engageable with respective top tires of the stack of tires supported on the deck portion, said top member having depending portions;

e. cooperating means on said top member and on said standards, wherein upper portions of said standards and the depending portion are sleeved one within the other, for removably securing said top member on said standards in spaced relation with the deck portion for holding tires compressed between said top member and said deck portion;

f. said depending portions being adapted for engagement with portions of said standards mounting means when said standards are in said prone position wherein said top member is nested on said base member.

12. A tire shipping and storage structure comprising:

a. a base member having a substantially horizontal deck portion adapted to support at least one stack of compressed tires, said deck portion having a substantially flat surface extending between peripheral edges thereof for engagement with said stack of tires;

b. a plurality of standards mounted on the deck portion adjacent corners of said deck portion and extending upwardly therefrom;

c. a top member having portions engageable with respective top tires of said stack of tires supported on the deck portion, said flat surface, said top member portions and standards cooperate providing unobstructed entry for loading and unloading of said stack of compressed tires therebetween;

d. means associated with said top member and said standards and securing said top member on said standards in spaced relation with the deck portion for holding tires compressed therebetween, said tires being held only by the base member deck portion and the top member; and e. said standards having means thereon permitting adjustment of the spacing between said top member and the deck portion for accommodating different heights of said at least one stack of tires, said at least one stack of tires being compressed prior to loading to a height less than the space between said top member and deck portion and being inserted therebetween and allowed to expand against same whereby said at least one stack of tires is restrained therebetween in a compressed condition.

13. A tire shipping and storage structure comprising:

a. a base member having a substantially horizontal deck portion adapted to support at least one stack of compressed tires, said deck portion having a substantially flat surface extending between peripheral edges thereof for engagement with said stack of tires;

b. a plurality of standards mounted on the deck portion adjacent corners of said deck portion and extending upwardly therefrom, said standards being swingably mounted on said base member and selectively swingable from an upright position to a substantially prone position overlying said base member;

c. a top member having portions engageable with respective top tires of said stack of tires supported on the deck portion, said flat surface, said top member portions and standards cooperate providing unobstructed entry for loading and unloading of said stack of compressed tires therebetween;

d. means associated with said top member and said standards and securing said top member on said standards in spaced relation with the deck portion for holding tires compressed therebetween, said tires being held only by the base member beck portion and the top member, said means removably securing said top member on said standards and engaging portions of said top member and removably securing same on said standards; and e. retaining members associated with each of said standards and cooperating therewith selectively holding same in said upright position.

14. A tire shipping and storage structure as set forth in claim 13 wherein:

a. said standards are hollow adjacent upper ends thereof and said top member engaging portions are depending members each receivable within a respective standard at the upper end thereof and selectively retained therein by a respective said latch member;

b. said depending members each have an inclined surface portion engageable with portions of a respective latch member to move said respective latch member to a nonlatching position facilitating entry of said respective depending member into said respective standard.

15. A tire shipping and storage structure as set forth in claim 13 wherein:

a. said standards are swingably mounted on brackets that are secured to said deck portion, said brackets and said standards having cooperating abutment portions limiting upward swinging movement of said standards;

b. said retaining members include sleeve members each slidably mounted on respective said standards selectively cooperating with portions of respective said brackets and respective said standards for selectively holding said standards in said upright position.

16. A tire shipping and storage structure comprising:

a. a base member having a substantially horizontal deck portion adapted to support at least one stack of compressed tires, said deck portion having a substantially flat surface extending between peripheral edges thereof for engagement with said stack of tires;

b. a plurality of standards mounted on the deck portion adjacent corners of said deck portion and extending upwardly therefrom, said standards each including:

1. a hollow first section and a second section with said second section being slidably received within said first section for relative longitudinal movement whereby said standard is extendable in length;

2. latch means mounted on said first section and operable for engaging portions of said second section retaining same in a selected position, each said latch means including:

i. a bracket secured to a respective first section having abutment forming portions extending therefrom, said first and second sections having adjacent wall members with at least one aperture through said first section wall member and a plurality of longitudinally spaced apertures through said second section wall member;

ii. a latch member movably mounted on said bracket and having a portion thereof adapted for selectively extending through aligned apertures of said first and second sections;

iii. a resilient member mounted on said latch member cooperating with portions thereof and with said abutment forming portions urging said latch member to remain in a position extending through said aligned apertures;

c. a top member having portions engageable with respective top tires of said stack of tires supported on the deck portion, said flat surface, said top member portions and standards cooperate providing unobstructed entry for loading and unloading of said stack of compressed tires therebetween; and d. means associated with said top member and said standards and securing said top member on said standards in spaced relation with the deck portion for holding tires compressed therebetween, said tires being held only by the base member deck portion and the top member.

17. A tire shipping and storage structure comprising:

a. a base member having a substantially horizontal deck portion adapted to support at least one stack of compressed tires, said deck portion having a substantially flat surface extending between peripheral edges thereof for engagement with said stack of tires;

b. a plurality of standards mounted on the deck portion adjacent corners of said deck portion and extending upwardly therefrom, said standards being movable from an upright position to a substantially prone position overlying said base member;

c. a top member having portions engageable with respective top tires of said stack of tires supported on the deck portion, said flat surface, said top member portions and standards cooperate providing unobstructed entry for loading and unloading of said stack of compressed tires therebetween;

d. retaining members on the base member for each standard and selectively engageable with a respective standard for holding same in said upright position; and e. cooperative interengageable latch portions on the top member and standards operative to removably secure the top member on the standards when the standards are in upright position with said top member on said standards in spaced relation with the deck portion for holding tires compressed therebetween said tires being held only by the base member deck portion and the top member.

* * * * *